(12) United States Patent
Tyson et al.

(10) Patent No.: US 9,489,506 B2
(45) Date of Patent: Nov. 8, 2016

(54) LINKING AD HOC NETWORKS

(71) Applicant: QUALCOMM TECHNOLOGIES INTERNATIONAL, LTD., Cambridge (GB)

(72) Inventors: Hugo Mark Tyson, Cambridge (GB); Nicolas Guy Albert Graube, Barrington (GB); Robin Heydon, Cottenham (GB)

(73) Assignee: QUALCOMM TECHNOLOGIES INTERNATIONAL, LTD., Cambridge (GB)

( * ) Notice: Subject to any disclaimer, the term of this patent is extended or adjusted under 35 U.S.C. 154(b) by 186 days.

(21) Appl. No.: 14/297,324

(22) Filed: Jun. 5, 2014

(65) Prior Publication Data
US 2015/0245412 A1    Aug. 27, 2015

(30) Foreign Application Priority Data

Feb. 25, 2014  (GB) .................................... 1403312.0
Feb. 25, 2014  (GB) .................................... 1403314.6
Mar. 31, 2014  (GB) .................................... 1405797.0

(51) Int. Cl.
*H04W 84/18* (2009.01)
*H04W 88/06* (2009.01)
(Continued)

(52) U.S. Cl.
CPC ........... *G06F 21/44* (2013.01); *G06Q 10/0833* (2013.01); *H04B 7/14* (2013.01); *H04H 20/71* (2013.01); *H04L 5/0055* (2013.01); *H04L 9/0861* (2013.01); *H04L 41/082* (2013.01); *H04L 41/14* (2013.01); *H04L 43/065* (2013.01); *H04L 43/0817* (2013.01); *H04L 43/0852* (2013.01); *H04L 43/0882* (2013.01); *H04L 43/10* (2013.01); *H04L 45/02* (2013.01); *H04L 47/115* (2013.01); *H04L 47/16* (2013.01); *H04L 49/1584* (2013.01); *H04L 63/061* (2013.01);
(Continued)

(58) Field of Classification Search
None
See application file for complete search history.

(56) References Cited

U.S. PATENT DOCUMENTS 6,917,974 B1   7/2005   Stytz et al.
6,986,046 B1   1/2006   Tuvell et al.
(Continued)

FOREIGN PATENT DOCUMENTS

CN   102761941 A   10/2012
CN   102984798 A   3/2013
(Continued)

OTHER PUBLICATIONS

Search Report for DE Application 10 2014 012 258.1 mailed on Mar. 2, 2015 (12 pages).
(Continued)

*Primary Examiner* — Kevin C Harper
*Assistant Examiner* — Derrick V Rose
(74) *Attorney, Agent, or Firm* — The Marbury Law Group, PLLC (57) ABSTRACT

A communication device capable of communicating according to two communication protocols, the device being configured to: in response to receiving a first message according to a first one of the protocols, the first message including data defining a payload, automatically retransmit a second message according to the first protocol, the second message comprising data defining an identical payload to that of the first message; and in response to receiving the first message, automatically transmit a third message according to the second protocol, the second message also comprising data defining an identical payload to the first message.

15 Claims, 4 Drawing Sheets

(51) Int. Cl.

| | |
|---|---|
| H04W 12/06 | (2009.01) |
| H04W 92/02 | (2009.01) |
| G06F 21/44 | (2013.01) |
| H04L 12/26 | (2006.01) |
| H04W 40/24 | (2009.01) |
| H04L 12/751 | (2013.01) |
| H04L 12/24 | (2006.01) |
| H04L 9/08 | (2006.01) |
| H04W 76/02 | (2009.01) |
| H04B 7/14 | (2006.01) |
| H04L 12/801 | (2013.01) |
| H04L 12/933 | (2013.01) |
| H04L 29/08 | (2006.01) |
| G06Q 10/08 | (2012.01) |
| H04W 4/02 | (2009.01) |
| H04L 5/00 | (2006.01) |
| H04W 4/06 | (2009.01) |
| H04L 29/06 | (2006.01) |
| H04W 12/04 | (2009.01) |
| H04W 16/18 | (2009.01) |
| H04W 52/38 | (2009.01) |
| H04W 4/00 | (2009.01) |
| H04W 24/06 | (2009.01) |
| H04W 52/02 | (2009.01) |
| H04H 20/71 | (2008.01) |
| H04W 72/12 | (2009.01) |

(52) U.S. Cl.
CPC .......... *H04L 63/08* (2013.01); *H04L 63/0853* (2013.01); *H04L 67/30* (2013.01); *H04L 69/22* (2013.01); *H04W 4/008* (2013.01); *H04W 4/028* (2013.01); *H04W 4/06* (2013.01); *H04W 12/04* (2013.01); *H04W 12/06* (2013.01); *H04W 16/18* (2013.01); *H04W 24/06* (2013.01); *H04W 40/24* (2013.01); *H04W 52/0251* (2013.01); *H04W 52/38* (2013.01); *H04W 72/12* (2013.01); *H04W 76/021* (2013.01); *H04W 76/023* (2013.01); *H04W 84/18* (2013.01); *H04W 88/06* (2013.01); *Y02B 60/50* (2013.01)

(56) References Cited

U.S. PATENT DOCUMENTS

| | | | |
|---|---|---|---|
| 7,522,540 | B1 | 4/2009 | Maufer |
| 7,778,270 | B1 | 8/2010 | Zhang et al. |
| 7,787,427 | B1 | 8/2010 | Simon et al. |
| 8,495,618 | B1 | 7/2013 | Inbaraj et al. |
| 8,516,269 | B1 | 8/2013 | Hamlet et al. |
| 8,938,792 | B2 | 1/2015 | Koeberl et al. |
| 8,953,790 | B2 | 2/2015 | Qi et al. |
| 2002/0119770 | A1 | 8/2002 | Twitchell, Jr. |
| 2003/0037237 | A1 | 2/2003 | Abgrall et al. |
| 2003/0163554 | A1 | 8/2003 | Sendrowicz |
| 2003/0181203 | A1 | 9/2003 | Cheshire |
| 2005/0113102 | A1 | 5/2005 | Kwon et al. |
| 2005/0175184 | A1 | 8/2005 | Grover et al. |
| 2005/0246533 | A1 | 11/2005 | Gentry |
| 2006/0034233 | A1 | 2/2006 | Strutt et al. |
| 2006/0041653 | A1 | 2/2006 | Aaron |
| 2006/0135064 | A1 | 6/2006 | Cho et al. |
| 2006/0154598 | A1 | 7/2006 | Rudland et al. |
| 2006/0156390 | A1 | 7/2006 | Baugher |
| 2006/0209584 | A1 | 9/2006 | Devadas et al. |
| 2006/0212938 | A1 | 9/2006 | Suzuki |
| 2006/0268749 | A1 | 11/2006 | Rahman et al. |
| 2007/0097895 | A1 | 5/2007 | Keshavarzian et al. |
| 2007/0105542 | A1 | 5/2007 | Friedman |
| 2007/0110024 | A1 | 5/2007 | Meier |
| 2007/0127421 | A1 | 6/2007 | D'Amico et al. |
| 2007/0206537 | A1 | 9/2007 | Cam-Winget et al. |
| 2007/0211654 | A1 | 9/2007 | Kim et al. |
| 2007/0211736 | A1 | 9/2007 | Sapek et al. |
| 2007/0247303 | A1 | 10/2007 | Payton |
| 2007/0280137 | A1 | 12/2007 | Bahr et al. |
| 2008/0013947 | A1 | 1/2008 | Peloso et al. |
| 2008/0095059 | A1 | 4/2008 | Chu |
| 2008/0205385 | A1 | 8/2008 | Zeng et al. |
| 2008/0292105 | A1 | 11/2008 | Wan et al. |
| 2009/0067373 | A1 | 3/2009 | Kneckt et al. |
| 2009/0216349 | A1 | 8/2009 | Kwon et al. |
| 2009/0222659 | A1 | 9/2009 | Miyabayashi et al. |
| 2009/0232037 | A1 | 9/2009 | Dixit et al. |
| 2010/0005294 | A1 | 1/2010 | Kostiainen et al. |
| 2010/0046439 | A1 | 2/2010 | Chen et al. |
| 2010/0100940 | A1 | 4/2010 | Reynolds |
| 2010/0141406 | A1 | 6/2010 | Jo et al. |
| 2010/0149028 | A1 | 6/2010 | Mermet et al. |
| 2010/0191968 | A1 | 7/2010 | Patil et al. |
| 2010/0202345 | A1* | 8/2010 | Jing .................. H04L 12/2832 370/328 |
| 2010/0205281 | A1 | 8/2010 | Porter et al. |
| 2010/0241857 | A1 | 9/2010 | Okude et al. |
| 2010/0262828 | A1 | 10/2010 | Brown et al. |
| 2011/0053493 | A1 | 3/2011 | Yanagihara |
| 2011/0081860 | A1 | 4/2011 | Brown et al. |
| 2011/0099368 | A1 | 4/2011 | Koh |
| 2011/0216695 | A1 | 9/2011 | Orth |
| 2012/0087290 | A1 | 4/2012 | Rhee et al. |
| 2012/0195231 | A1 | 8/2012 | Fonseca et al. |
| 2012/0196534 | A1 | 8/2012 | Kasslin et al. |
| 2012/0198434 | A1 | 8/2012 | Dirstine et al. |
| 2012/0252405 | A1 | 10/2012 | Lortz et al. |
| 2012/0263072 | A1 | 10/2012 | Wu |
| 2013/0016654 | A1 | 1/2013 | Mayo et al. |
| 2013/0029685 | A1 | 1/2013 | Moshfeghi |
| 2013/0051552 | A1 | 2/2013 | Handschuh et al. |
| 2013/0064175 | A1 | 3/2013 | Pandey et al. |
| 2013/0065584 | A1 | 3/2013 | Lyon et al. |
| 2013/0067222 | A1 | 3/2013 | Munger et al. |
| 2013/0070745 | A1 | 3/2013 | Nixon et al. |
| 2013/0080765 | A1 | 3/2013 | Mohanty et al. |
| 2013/0128809 | A1* | 5/2013 | Wentink ............. H04L 29/0604 370/328 |
| 2013/0130622 | A1 | 5/2013 | Yang et al. |
| 2013/0219482 | A1 | 8/2013 | Brandt |
| 2013/0279409 | A1 | 10/2013 | Dublin, III et al. |
| 2014/0047260 | A1 | 2/2014 | Iijima |
| 2014/0089912 | A1 | 3/2014 | Wang et al. |
| 2014/0108786 | A1 | 4/2014 | Kreft |
| 2014/0111234 | A1 | 4/2014 | Laackmann et al. |
| 2014/0112470 | A1 | 4/2014 | Shen et al. |
| 2014/0167912 | A1 | 6/2014 | Snyder et al. |
| 2014/0169174 | A1* | 6/2014 | Gilson .................. H04L 45/24 370/237 |
| 2014/0189790 | A1 | 7/2014 | Mindler et al. |
| 2014/0266669 | A1 | 9/2014 | Fadell et al. |
| 2015/0052351 | A1 | 2/2015 | Nodehi Fard Haghighi et al. |
| 2015/0143130 | A1 | 5/2015 | Ducharme et al. |
| 2015/0242614 | A1 | 8/2015 | Scagnol et al. |
| 2015/0244481 | A1 | 8/2015 | Tyson et al. |
| 2015/0244484 | A1 | 8/2015 | Tyson et al. |
| 2015/0244565 | A1 | 8/2015 | Heydon et al. |
| 2015/0244623 | A1 | 8/2015 | Heydon et al. |
| 2015/0244648 | A1 | 8/2015 | Tyson et al. |
| 2015/0244828 | A1 | 8/2015 | Heydon |
| 2015/0245179 | A1 | 8/2015 | Jarvis et al. |
| 2015/0245182 | A1 | 8/2015 | Scagnol et al. |
| 2015/0245203 | A1 | 8/2015 | Tyson et al. |
| 2015/0245204 | A1 | 8/2015 | Heydon |
| 2015/0245220 | A1 | 8/2015 | Williamson et al. |
| 2015/0245231 | A1 | 8/2015 | Jarvis et al. |
| 2015/0245296 | A1 | 8/2015 | Tyson et al. |

(56) References Cited

U.S. PATENT DOCUMENTS

| | | |
|---|---|---|
| 2015/0245351 A1 | 8/2015 | Banerjea et al. |
| 2015/0245369 A1 | 8/2015 | Heydon |

FOREIGN PATENT DOCUMENTS

| | | |
|---|---|---|
| EP | 1496668 A1 | 1/2005 |
| EP | 1780951 A2 | 5/2007 |
| EP | 1886450 B1 | 2/2008 |
| EP | 2306692 A1 | 5/2014 |
| GB | 2464125 A | 4/2010 |
| JP | 2007124148 A | 5/2007 |
| WO | 02078272 A1 | 10/2002 |
| WO | 03026224 A1 | 3/2003 |
| WO | 2004004230 A1 | 1/2004 |
| WO | 2004104850 A1 | 12/2004 |
| WO | 2007013914 A1 | 2/2007 |
| WO | 2008013878 A1 | 1/2008 |
| WO | 2008004102 A2 | 5/2008 |
| WO | 2009082151 A2 | 9/2009 |
| WO | 2009088887 A2 | 10/2009 |
| WO | 2010036885 A2 | 4/2010 |
| WO | 2010/089737 A1 | 8/2010 |
| WO | 2011043755 A1 | 4/2011 |
| WO | 2012064178 A1 | 5/2012 |
| WO | 2013010427 A1 | 1/2013 |
| WO | 2013028404 A1 | 2/2013 |
| WO | 2013057666 A1 | 4/2013 |
| WO | 2014/000163 A1 | 1/2014 |

OTHER PUBLICATIONS

Search Report for DE Application 10 2014 012 518.1 mailed on Feb. 27, 2015 (14 pages).
Search Report for DE Application 10 2014 012 615.3 mailed on Jan. 27, 2015 (6 pages).
Search Report for GB Application 1405790.5 mailed on Oct. 14, 2014 (5 pages).
Search Report for GB Application 1501943.3 mailed on Mar. 20, 2015 ( 4 pages).
Search Report for GB Application 1412722.9 mailed on Jan. 13, 2015 (6 pages).
Search Report for GB Application 1415178.1 mailed on Sep. 25, 2014 (5 pages).
Search Report for GB Application 1405797.0 mailed on Sep. 2, 2014 (3 pages).
Search Report for GB Application 1405789.7 mailed on Sep. 26, 2014 (4 pages).
Search Report for GB Application 1412715.3 mailed on Jan. 8, 2015 (3 pages).
Search Report for GB Application 1415177.3 mailed on Sep. 10, 2014 (4 pages).
Search Report for DE Application 10 2014 012 257.3 mailed on Jan. 27, 2015 (7 pages).
Search Report for DE Application 10 2014 012 616.1 mailed on Feb. 3, 2015 (6 pages).
Search Report for Application No. GB1406797.0 mailed on Jul. 17, 2014, 4 pages.
Chiang et al., "Neighborhood-Aware Density Control in Wireless Sensor Networks" published in Sensor Networks, Ubiquitous and Trustworthy Computing, 2008. SUTC '08, IEEE International Conference on, Jun. 11-13, 2008, pp. 122-129, publisher IEEE, Taichung.
Balachandran et al., "Adaptive sleeping and awakening protocol (ASAP)for energy efficient adhoc sensor networks" published in Communications, 2005. ICC 2005. 2005 IEEE International Conference on, May 20, 2005, pp. 1068-1074 (vol. 2), publisher IEEE, Seoul.
Search Report for Application No. GB1403314.6 mailed on Jun. 20, 2014, 4 pages.
Search Report for Application No. GB1405789.7 mailed on Jul. 24, 2014, 4 pages.
Search Report for Application No. GB1403312.0 mailed on Jun. 25, 2014, 3 pages.
Search Report for Application No. GB1405786.3 mailed on Jul. 17, 2014, 3 pages.
Search Report for Application No. GB1405790.5 mailed on Jul. 22, 2014, 4 pages.
Search Report for Application No. GB1413880.4 mailed on Aug. 18, 2014, 7 pages.
Search Report for Application No. GB1405791.3 mailed on Jun. 26, 2014, 3 pages.
Search Report for Applicawtion No. GB1405785.5, mailed on Jul. 28, 2014, 4 pages.

* cited by examiner

LINKING AD HOC NETWORKS

TECHNICAL FIELD

This invention relates to linking ad hoc networks.

BACKGROUND OF THE INVENTION

Figure 1:
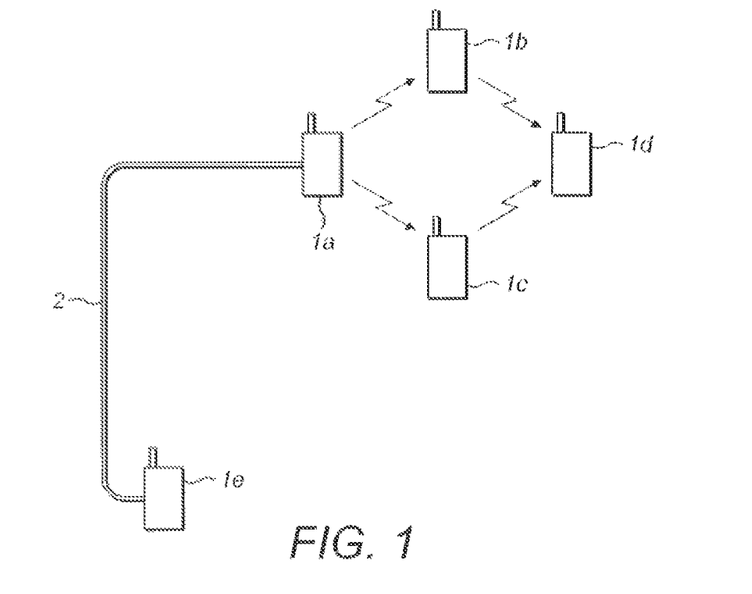
FIG. 1 shows a distributed network.

FIG. 1 shows a distributed network. The network comprises a number of devices 1. Each device can communicate wirelessly with the other devices that are in effective range of it. In this example the network is a mesh network. The devices can cooperate to propagate signals between them. For example, if device 1a transmits a signal, that signal can be received by devices 1b and 1c which are within range of device 1a. Devices 1b and 1c can then relay the signal received from device 1a so that it can be received by device 1d which is out of range of device 1a. This method of communication allows devices to communicate even though they are out of direct range of each other.

FIG. 1 shows a further device 1e which is out of wireless range of all the devices 1a to 1d. In a basic mesh network none of the devices 1a to 1d can communicate with device 1e using the mesh protocol. However, they may be able to communicate with device 1e using some other protocol. For example, devices 1a and 1e might be connected to a wired network as illustrated at 2, and that pair of devices may be able to communicate over that wired network. The wired network might be expected to use a different protocol from the wireless protocol. A consequence of that may be that device 1a cannot simply forward messages of the mesh protocol to device 1e, which can make communications with device 1e inconvenient.

It may be possible to impose the same protocol on the wired network and the wireless mesh network. However, the inherent differences in the capabilities of those networks mean that imposing the same protocol would be expected to reduce performance. For example, the mesh network might be expect to involve greater latency, higher numbers of retransmissions and a greater level of interference than the wired network. Therefore, it might be desirable to have different message lengths, retransmission protocols and addressing protocols, among other distinctions, as between the different networks. Those differences lead to the difficulties of intercommunication discussed above.

There is a need for an improved way of communicating between devices in a mesh network and devices that are external to the mesh.

SUMMARY OF THE INVENTION

According to one aspect of the present invention there is provided a communication device capable of communicating according to two communication protocols, the device being configured to: in response to receiving a first message according to a first one of the protocols, the first message including data defining a payload, automatically retransmit a second message according to the first protocol, the second message comprising data defining an identical payload to that of the first message; and in response to receiving the first message, automatically transmit a third message according to the second protocol, the third message also comprising data defining an identical payload to the first message. In an alternative embodiment of the above invention, to which the same dependent features are, so far they are not contradictory, relevant, the first and second messages may be of the same protocol but pertain to different logical networks.

According to a second aspect of the present invention there is provided a method for relaying communication messages by means of a communication device, the method comprising: receiving a first message by means of the device, the first message being received according to a first protocol and including data defining a payload; in response to receiving the first message, automatically retransmitting a second message according to the first protocol, the second message comprising data defining an identical payload to that of the first message; and in response to receiving the first message, automatically transmitting a third message according to the second protocol, the second message also comprising data defining an identical payload to the first message.

The device may comprise a memory storing an authentication key. The device may be configured to, on receiving the first message, attempt to authenticate the first message by means of the authentication key.

The device may be configured to attempt to authenticate the first message by applying a first predetermined part of the first message and the authentication key as input to an authentication algorithm to form an authentication output, and to determine whether the authentication output matches a second predetermined part of the message, and to consider the message as authenticated if the authentication output matches the second predetermined part of the message.

The device may be configured to execute the payload of the message only if the first message is authenticated and/or its payload successfully decrypted. The device may attempt to decrypt and/or execute the payload of the message at an application layer. The device may be configured to, if the payload of the message (either as received or as decrypted) matches one or more predefined criteria, execute the payload of the message by transmitting a control signal to an appliance linked to the device. The appliance may be a domestic or industrial appliance. The appliance may be linked to the communication device by a wired data link. The appliance may be configured to change its operational state (e.g. to turn on or off one of its primary functions) in response to the control signal. The communication device may be configured to itself undergo a change of state in dependence on the content of the payload of the message (either as received or as decrypted).

The device may be configured to transmit the second message only if it authenticates the first message.

The device may be configured to transmit the second message irrespective of whether the first message is authenticated.

The device may be configured to transmit the third message only if the first message is authenticated.

The device may be configured to transmit the third message irrespective of whether the first message is authenticated.

The first and second messages may be of identical formats.

The first and second messages may each include a retransmission indicator. The device may be configured to transmit the second message only if the content of the retransmission indicator for the first message is of a predetermined form indicative of permitted retransmission. The predetermined form may be being not equal to a predetermined value. The device may be configured to transmit the second message with the content of its retransmission indicator being such as to indicate the same, an increased or a reduced propensity for retransmission compared to the content of the retransmission indicator of the first message. The retransmission indicator may represent a numeric value. The value of the retransmission indicator of the second message may be less than that of the first message.

The first and third messages may each include a retransmission indicator. The device may be configured to transmit the third message only if the content of the retransmission indicator of the first message is of a predetermined form indicative of permitted retransmission. The predetermined form may be being not equal to a predetermined value. The device may be configured to transmit the third message with the content of its retransmission indicator being such as to indicate the same, an increased or a reduced propensity for retransmission compared to the content of the retransmission indicator of the first message. The retransmission indicator may represent a numeric value. The value of the retransmission indicator of the third message may be equal to, or greater than or less than that of the first message.

The first and second messages may be conveyed wirelessly.

The third message may be is conveyed over a wired or a wireless transport.

The first and second messages may include a network indicator field the content of which indicates the logical network to which the respective message belongs.

The first predetermined part may excludes the network indicator field. The second predetermined part may include the network indicator field.

The network indicator field of the second message may indicate the same logical network as the network indicator field of the first message.

The network indicator field of the first message may be the same as that of the second message.

The network indicator field of the second message may indicate a different logical network than the network Indicator field of the first message.

The third message may include a network indicator field the content of which indicates the logical network to which the third message belongs.

The network indicator field of the third message may indicate the same logical network as the network indicator field of the first message.

The network indicator field of the third message indicates a different logical network than the network indicator field of the first message.

According to a third aspect of the present invention there is provided a communication device capable of operation in a mesh network according to a mesh network protocol that supports the transmission of mesh messages, each mesh message having a payload and being configured to indicate a logical mesh network to which the message pertains, the device being configured to: in response to receiving a first message according to the mesh network protocol, the first message being configured to indicate that it pertains to a first logical mesh network, automatically generate and transmit a second message according to the mesh network protocol, the second message comprising data defining an Identical payload to that of the first message and being configured to indicate that it pertains to a second logical mesh network.

According to a fourth aspect of the present invention there is provided a method for translating communication messages from one logical mesh network to another by means of a communication device, the method comprising: receiving a first message according to the mesh network protocol, the first message being configured to indicate that it pertains to a first logical mesh network; generating and transmitting a second message according to the mesh network protocol, the second message comprising data defining an identical payload to that of the first message and being configured to indicate that it pertains to a second logical mesh network.

The mesh network protocol may indicate that a message pertains to a particular logical mesh network by virtue of a first part of the message being related by a predetermined function to (i) the content of a second part of the message and (ii) a key associated with the particular logical mesh network. The device may be is configured to generate the second message having its first part related by the predetermined function to the content of the second part of the second message and a key associated with the second mesh network.

The predetermined function may be a cryptographic function.

The mesh network protocol may indicate that a message pertains to a particular logical mesh network by virtue of a part of the message being capable of successful decryption by a key associated with the particular logical mesh network, and the device is configured to generate the second message having that part encrypted by a key associated with the second mesh network.

The payload of the first message may be comprised in the result of successfully decrypting the said part of the message.

The said key associated with the second mesh network may be different from a key of corresponding functionality associated with the first mesh network.

The device may store the said key associated with the second mesh network and the key associated with the first mesh network.

The device may be configured to transmit the second message over the same physical layer as it received the first message.

The first message may include a retransmission indicator. The device may be configured to transmit the second message only if the content of the retransmission indicator of the first message is of a predetermined form indicative of permitted retransmission. The predetermined form may be being not equal to a predetermined value.

The first and second messages may each include a retransmission indicator. The device may be configured to transmit the second message with the content of its retransmission indicator being such as to indicate the same, an increased or a reduced propensity for retransmission compared to the content of the retransmission indicator of the first message.

The retransmission indicator may represent a numeric value. The value of the retransmission indicator of the second message may be equal to, or greater than or less than that of the first message.

The device may be further configured to, in response to receiving the first message, transmit a third message according to the mesh network protocol, the third message comprising data defining an identical payload to that of the first message and being configured to indicate that it pertains to the first logical mesh network.

The first, second and third messages may be conveyed wirelessly. The first, second and third messages may be conveyed over the same transport.

The present invention will now be described by way of example with reference to the drawings.

DETAILED DESCRIPTION OF THE INVENTION

Figure 2:
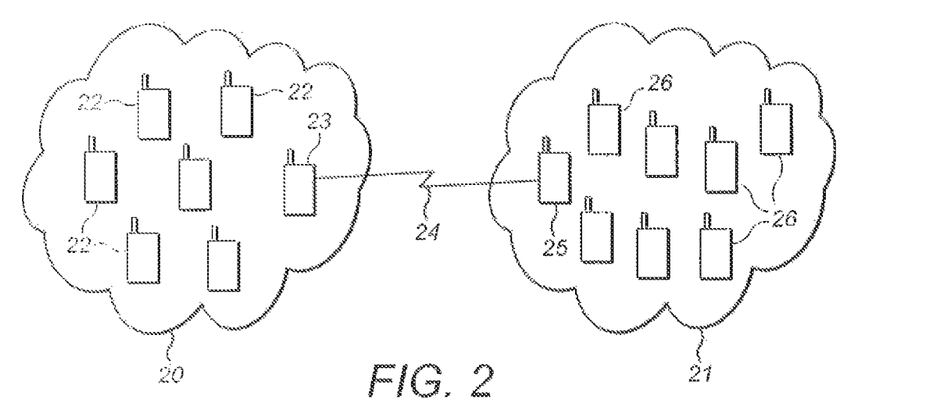
FIG. 2 shows a communication system with bridged mesh networks.

FIG. 2 shows a communication system comprising two mesh networks 20, 21. The first mesh network 20 comprises a number of devices 22, 23 which can communicate in an ad hoc manner to transfer data between each other. One of those devices, 23, is capable of communicating via a link 24 with a device 25 in the second network 21. The link 24 uses a protocol other than the mesh protocol. In the second network 21, device 25 and devices 26 can communicate with each other in an ad hoc manner. Devices 23 and 25 are configured to relay messages of the mesh protocol from network 20 over link 24 and inject them into network 21, and vice versa. In this way devices 22, which have no direct means of communication with devices in network 21 can communicate with devices 25 and 26. Devices 23 and 25 serve to bridge or tunnel between networks 20 and 21.

Figure 3:
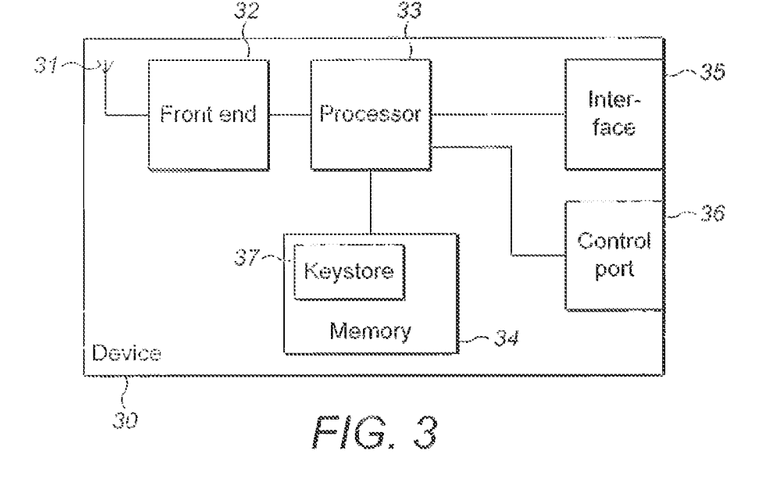
FIG. 3 shows the architecture of a mesh communication device.

FIG. 3 shows the architecture of one of the devices 22, 23, 25, 26 for communicating in the mesh network. The device 30 comprises an antenna 31, a radio frequency (RF) front end 32, a baseband processor 33, a non-volatile memory 34, a secondary communication interface 35 and a control port 36. In order to perform its functions the processor 33 executes program code that is stored in non-transient form in the memory 34. In order to transmit signals into the mesh network the processor 33 can drive the RF front end 32, which in turn causes the antenna 31 to emit suitable RF signals. Signals received at the antenna 31 from the mesh network can be pre-processed (e.g. by analogue filtering and amplification) by the RF front end 32, which presents corresponding signals to the processor 33 for decoding. The processor can respond to those signals in various ways, as will be described in more detail below. The secondary communication interface 35 supports a different physical and/or logical communications protocol from the one that is used for communicating over the mesh network. For example, the protocol for communicating over the mesh network could be or could be based on at least the physical layer of Bluetooth (e.g. Bluetooth Low Energy), ZigBee or IEEE 802.11. The mesh network could employ a wired protocol. Examples of the protocols that could be supported by the secondary communication interface include wireless protocols such as those listed above and also wired protocols such as Ethernet, USB or HomePlug. The protocol could operate over a dedicated communication line, over another line such as a power line, or wirelessly. When a connection is available from the secondary communication interface 35 the processor 33 can communicate using that interface. The control port 36 allows the processor to connect to an appliance local to the device 30 in order to control or receive input from that appliance.

Each of the devices in any of the mesh networks described herein can have the architecture shown in FIG. 3, although interface 35 and port 36 can be omitted when they are not required.

Figure 4:
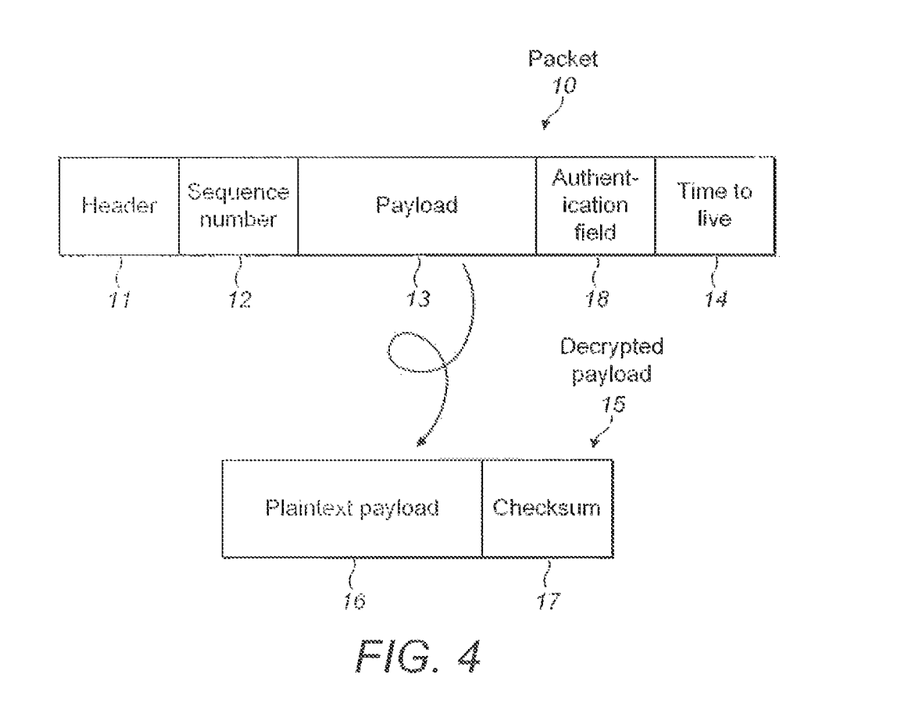
FIG. 4 illustrates a packet structure.

The mesh network operates by communicating data packets among the devices of the network. FIG. 4 shows a suitable format for one of the packets. The packet 10 comprises a header made up of a source address 11 and a sequence number 12, a payload 13, an authentication field 18 and a trailer comprising a time to live (TTL) field 14. The payload is optionally encrypted using an encryption key that is specific to a particular mesh network. When such a payload is successfully decrypted, as illustrated at 15, it comprises a plaintext payload 16 and optionally a checksum field 17.

Each device is assigned a unique identifier. When composing an original packet for transmission it inserts that identifier in the source address field 11. The unique identifier could be assigned at manufacture or when the network Is being configured.

Each device keeps a count of original packets it has composed. Each time it composes a new original packet it increments the count and Inserts the new count into the sequence number field 12. The length of the sequence number field can be set to be sufficient that a combination of fields 11 and 12 uniquely identify any packet that would be expected to be currently circulating in the system.

Each device has a keystore 37 where it stores in non-volatile fashion one or more encryption and/or authentication keys. The key used for authentication of a packet to a particular logical mesh network could be the same as or different from any key used to encrypt or decrypt its payload. As will be described in more detail below, a mesh network may be viewed at a physical level or a logical level. Logical mesh networks are distinguished from each other by their authentication keys. When a device composes a message for use in a certain logical mesh network it forms a payload 16 including the traffic data it wishes to convey and optionally generates a checksum 17 for that payload using a predefined checksum algorithm. It then concatenates the payload and the checksum and either:

(a) uses that concatenated string as the payload 13 for the new packet or (b) encrypts the concatenated string using a predefined encryption algorithm which takes as input the concatenated plaintext payload 15 and the encryption key that corresponds to the logical mesh network in question and uses the output of the encryption step as the payload 13.

In the latter case, the encryption key is selected to be one that is shared with a device that is configured to execute the payload.

The authentication field is used to indicate the logical mesh network to which the packet belongs. The authentication field is formed by executing an authentication algorithm that takes as input some or ail of the remainder of the packet (e.g., the payload, the payload and the header or the payload, the header and the TTL) and the authentication key corresponding to the logical mesh network. The authentication algorithm may include selecting a predefined set of bits of the output of the HMAC-SHA-256 algorithm, or in suitable propagation conditions could employ a cipher block chaining algorithm such as AES-128 CBC-MAC.

A device composing an original packet defines an original TTL for that message. The original TTL depends on the expected characteristics of the network, as will be discussed below, but could, for example, be a number such as 8.

Once the original packet is fully composed the originating device transmits it one or more times.

When one of the devices is participating in a mesh network it listens for mesh packets. It may listen continually or, to save power, intermittently. When it receives a mesh packet it attempts to authenticate the packet using one or each authentication key it has stored. It applies the relevant part of the received packet and a stored authentication key as input to the Inverse of the predefined authentication algorithm. It then compares the output of that process to the authentication field 18 of the received packet. If the two match then the packet can be considered successfully authenticated. If not, the device repeats the process with any other authentication keys it has stored.

If the device has successfully authenticated the packet it can pass the received payload for processing. The payload might be decrypted by means of an encryption key stored by the device. The payload may, for example, indicate that the device should perform some test function, or that the device should issue a control signal to an appliance connected to its control port 36.

An important feature of the mesh network is that a device can also re-transmit a packet it has received. Each device may be configured either to retransmit all mesh packets it receives irrespective of whether it can authenticate them, or only those mesh packets it can successfully authenticate, or only the mesh packets it can successfully authenticate by means of a predefined set of its stored authentication keys. Which of these behaviours a device adopts may be determined manually or automatically based on the power state of the device. A device that is powered by mains of electricity could be configured to detect that fact and based on that determination automatically enter a state in which it forwards mesh messages it receives irrespective of its ability to authenticate them. However, that behaviour is in general less preferred because it may result in redundant message transmission. A device that is powered by battery could be configured to detect that fact, or the fact that the battery charge is below a predetermined threshold, and based on that determination automatically enter a state in which it forwards only a subset of the mesh messages it receives, for example only the mesh messages it is capable of authenticating.

A device in the mesh network may be configured to not re-transmit certain mesh messages so as to suppress the possibility of mesh messages circulating indefinitely. One way to do this is for the device to be configured to store a record of messages it has already re-transmitted (e.g. by storing their source and sequence numbers) and to not re-transmit those messages if it receives them again. Another way to do this is by the device making a determination as to whether to re-transmit a received message in dependence on the message's TTL field.

A device could be configured by default and/or at manufacture to be in a state in which it forwards (i.e., sends through a non-mesh channel) and/or relays (i.e., sends directly through a mesh channel) all messages it successfully receives that are of the mesh protocol (i.e., all messages that meet a predefined set of characteristics of the protocol). The device may be configurable by a user to operate in a specific logical mesh network, for example by the user providing the device with an authentication key for that network and the device storing that authentication key in its keystore 37. The device may be configured so that once that storage step has taken place it operates by default to forward only messages that can be authenticated by means of one or each authentication key it is storing.

When a device retransmits a packet the device transmits the packet with data content identical to the content of the packet as it received it, except that it decrements the TTL value, e.g. by one. The system can be designed so each device is configured not to retransmit any mesh packets it receives with a TTL of zero. In that way the TTL serves to prevent messages circulating indefinitely in the mesh network. Configuring each device not to re-transmit a message whose unique identity matches one it has received and re-transmitted before can also help to suppress redundant message transmission. With this behaviour in mind, the original value of the TTL can be set to reflect the propagation properties of the network. A large or unreliable network may suit a larger initial TTL value than a smaller, more reliable network. In other implementations the TTL could be interpreted in other ways: for example it could be incremented up to a pre-set limit at each retransmission.

Packets can be transmitted between the devices participating in a mesh network. A device can transmit an original packet into the network, other devices participating in the network can serve as a transport for that message to reach another device that is out of direct range of the originating device. The devices need not be fixed in location: they could be mobile. The devices could participate in the network continually or from time to time.

Returning to FIG. 2, devices 22 and 23 are participating in a first mesh network 20. Devices 25 and 26 are participating in a second mesh network 21. In a first example, networks 20 and 21 are physically separate but logically united. The networks are physically separate in the sense that none of the devices in either network is in wireless range of the devices in the other network for the transmission of mesh packets. The networks are logically united in that all the devices in each network store a common authentication key that is used for the authentication of mesh packets.

Devices 23 and 25 are connected to network 24 by means of their secondary communication interfaces 35. Network 24 could be a wired network. In one example it could extend from one floor of a building to another. In that instance it might be a private network. In another example network 24 could operate over the internet.

Devices 23 and 25 are configured to implement an additional mechanism for retransmission of mesh messages. Taking device 23 for illustration, when device 23 receives a wireless mesh message it can retransmit that message wirelessly into its physically local mesh network based on the principles set out above. It can also transmit the message to device 25 over network 24 for retransmission by device 25 into the other mesh network 21.

Device 23 may be configured to retransmit over link 24 all mesh packets if receives wirelessly, or only those mesh packets it receives wirelessly and can successfully authenticate, or only the mesh packets it receives wirelessly and can successfully authenticate by means of a predefined set of its stored authentication keys. Which of these behaviours device 23 adopts may be determined manually or automatically in dependence on the power state of the device, on the principles previously described. Device 25 operates similarly.

Device 25 may be configured to transmit into mesh network 21 all mesh packets it receives over link 24, or only those mesh packets it receives over link 24 and can successfully authenticate, or only the mesh packets it receives over link 24 and can successfully authenticate by means of a predefined set of its stored authentication keys. Which of these behaviours device 25 adopts may be determined manually or automatically in dependence on the power state of the device, on the principles previously described. Device 23 operates similarly.

Devices 23 and 25 may be configured to use a predefined protocol to transmit mesh packets over link 24. For example, they may encapsulate each mesh packet in a packet of another protocol that operates over link 24, for instance as an Ethernet frame.

In this way, a device 22 in mesh network 20 can form an original mesh packet and launch it into mesh network 20.

The mesh packet can be retransmitted wirelessly among the devices of network 20 and arrive at bridging device 23 which itself is a participant in network 20. Bridging device 23 can forward the mesh packet, perhaps encapsulated in one or more datagrams of another protocol, to a counterpart bridging device 25 using link 24. Link 24 could be a wired or wireless link. Then bridging device 25 can launch the forwarded mesh packet into mesh network 21, where it can be retransmitted wirelessly among the devices of network 20. The payload of the mesh packet may indicate that one or more of devices 26 should take some action in response to the packet. If such a device stores the same authentication key as the originating device in network 20 used to form the authentication field 18 of the packet, it can successfully authenticate the packet, and will then interpret and act on the packet's payload.

In a simple implementation, when devices 23 and 25 cooperate to forward a mesh packet from one mesh network to another they leave the content of the packet entirely unchanged. This reduces processing load at the devices 23 and 25. Furthermore, if bridging devices 23 and 25 are configured to forward all mesh packets irrespective of their logical mesh network then neither bridging device 23, 25 needs to authenticate the payload of the mesh packet. That again reduces processing load and in that way devices 23 and 25 can serve to bridge between logical mesh networks in which they cannot themselves actively participate.

Other more complex arrangements are possible. As a first example, irrespective of whether the bridging devices can or do authenticate the mesh payload of a forwarded packet, one or both of the bridging devices could alter the TTL value of a forwarded packet. Either or both of the bridging devices could decrement the TTL value (e.g. by one). The bridging device that forwards the mesh packet could decrement the TTL before transmitting the packet over link 24. The bridging device that receives the mesh packet could decrement the TTL before transmitting it wirelessly into its local physical mesh network. A bridging device that receives a mesh packet from another bridging device could alter the TTL of that packet to suit the propagation properties of its local physical or logical mesh network. For example, the mesh packet might have originated in a small mesh network in which a TTL of, say, 5 is adequate to give a reliable probability of a packet being received by all devices in that network. The packet might then be forwarded into a larger mesh network. In that case, on transmitting the packet into the larger network the appropriate bridging device may increase the packet's TTL. This mechanism may be unnecessary if each device can adaptively set the original TTL value it uses based on information it has gathered about the propagation characteristics of the logical mesh network whose key is used to transmit the packet. However, it may be valuable if the originating device was configured to set the original TTL value based on information it had gathered about the propagation characteristics of the physical mesh network in which it is located.

Second, one or both of the bridging devices may be configured to translate forwarded mesh packets from one logical mesh network to another. They can do this by receiving a packet, forming a new authentication field for the packet using pre-defined authentication algorithm and an authentication key for a new logical mesh network, reconstructing the packet with the original authentication field replaced by the new authentication field, and transmitting the newly formed packet.

FIGS. 5 to 9 illustrate various possibilities for logical mesh translation and bridging. In each figure 40 and 41 represent mesh networks, 42 and 43 represent bridging devices located in networks 40 and 41 respectively and 44 represents a non-mesh protocol link between the bridging devices. $K_1$, $K_2$, $K_3$, $K_4$, $K_5$ and K6 represent the authentication keys in use in the mesh networks and stored in the bridging devices.

Figure 5:
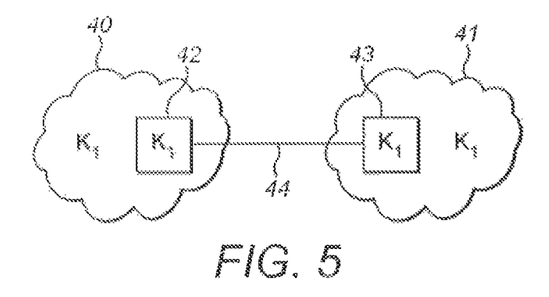
FIGS. 5 to 9 illustrate possible inter-arrangements of logical and physical networks.

FIG. 5 shows the situation where both mesh networks use the same authentication key, and both bridging devices store that key. In this situation the bridging devices could optionally filter the messages they bridge between the networks in dependence on their ability to authenticate the mesh payload.

Figure 6:
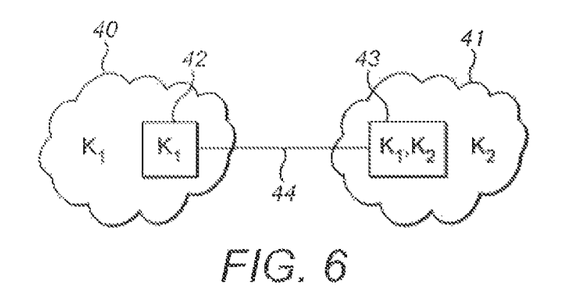

FIG. 6 shows the situation where the mesh networks use different authentication keys. One of the bridging devices 43 stores the authentication keys of both mesh networks. That bridging device can translate packets from one mesh network to the other. Thus when bridging device 43 receives a mesh packet from bridging device 42, the authentication field of that mesh packet will be authenticated with key $K_1$. Bridging device 43 can optionally authenticate that payload using $K_1$, which it has stored. Then it can form a new authentication field using $K_2$, which it also has stored, before transmitting the resulting mesh packet wirelessly into Its local mesh network 41. When bridging device 43 is to forward a mesh packet from network 41 to bridging device 42 it can optionally authenticate that packet using $K_2$. Then it can form a new authentication field using $K_1$ and forward forwarding the resulting mesh packet to bridging device 42. Bridging device 42 could also have access to both keys, and could operate in the same way. Either or both of the bridging devices could filter bridged messages based on their compliance with the network key(s) they store.

Figure 7:
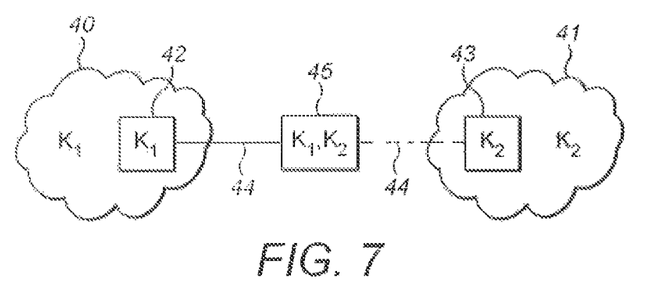

In FIG. 7 there is an additional payload translation device 45 in the network between bridging devices 42 and 43. Payload translation device is not an active participant in a mesh network but it can translate messages being forwarded from device 42 to device 43 from key $K_1$ to key $K_2$, and vice versa.

Figure 8:
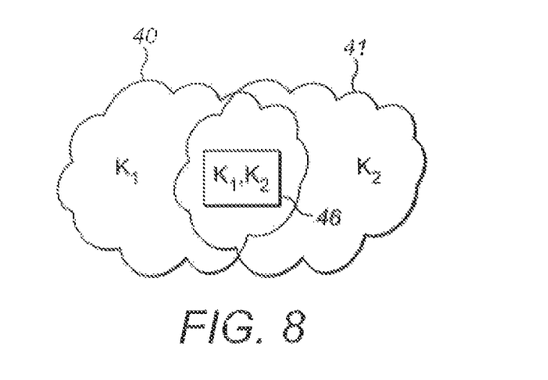

In FIG. 8 there is a wireless bridging/translation device 46. Device 46 stores two authentication keys and is located so as to be able to participate in two logical mesh networks 40, 41. Device 46 is configured to retransmit messages from either network in the usual way. In addition, device 46 is configured to translate mesh messages it receives wirelessly from one key to the other and then retransmit them. In that way, it bridges those messages from one logical mesh network to another. This means that each time the device 46 receives a single mesh message from one of the logical mesh networks it may transmit two messages: one retransmitting the message within the same logical mesh network as it was received from, and one launching the message into the other logical mesh network. Device 46 may be configured to translate from one logical mesh network to another but not vice versa, or to translate messages in both directions. In order to actively participate in both networks 40, 41, device 46 needs to be within wireless transmission range of at least one other device in each of those logical networks. This makes the networks physically overlapping. Device 46 could be provided with a link such as link 44 by means of which it can also forward mesh messages to another network.

Figure 9:
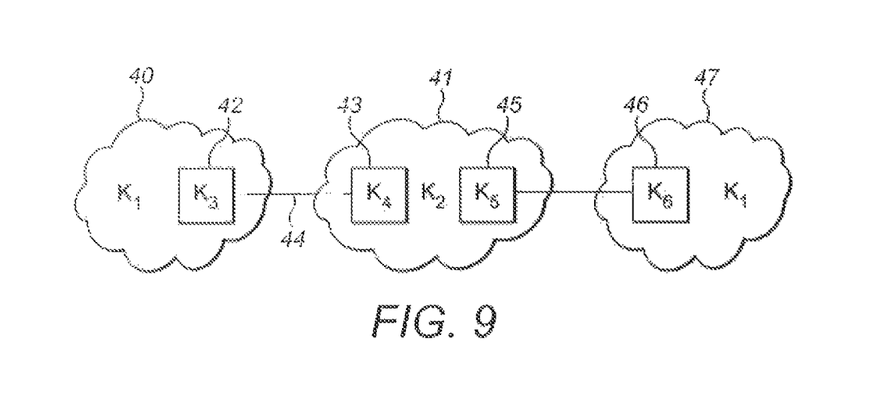

FIG. 9 shows a situation in which neither bridging device shares an authentication key with the mesh network in which it is physically located. Nevertheless, if the bridging devices are configured to forward messages irrespective of their ability to authenticate them the devices can still bridge between the networks 40, 41. If the networks 40, 41 used the same authentication key as each other then this would permit devices in networks 40, 41 to intercommunicate. As illustrated, networks 40, 41 use different authentication keys. However, if sufficient devices in network 41 are configured to forward mesh messages irrespective of their ability to authenticate them then network 41 can serve to transport mesh messages from bridging device 43 to bridging device 45. Bridging device 45 is a second bridging device located within the footprint of network 41. Bridging device 45 is connected to a further budging device in network 47. Network 47 shares the same network key as network 40, It can be seen that in this situation the bridging devices can form a chain, irrespective of their stored authentication keys, which can permit the forwarding of mesh messages serially between mesh networks.

In the examples given above, logical mesh networks are distinguished by authentication key. Other mechanisms may be used to distinguish logical mesh networks. For example, each mesh packet could include a plaintext field which directly indicates the identity of the logical mesh network to which that packet pertains. The devices participating in the mesh networks could filter and interpret packets based on that field irrespective of whether they store the appropriate authentication key(s). In another example, each payload could be encrypted and the identification of the logical mesh network to which a packet relates could be dependent on the encryption key used to encrypt that payload. In another example, each device could store a list or definition of the addresses of other devices in a logical mesh network of which it is a part, and determine whether a packet pertains to that network in dependence on whether the source address 11 indicated an the packet's header is contained in that list or matches that definition.

Devices may be configured to determine whether or not to retransmit or forward mesh messages based on other criteria than the logical mesh network to which a message relates and the message's TTL. For example, devices could be configured only to retransmit or forward messages whose source address 11 matches pre-defined criteria (e.g. indicating that the message originates from one or more specific source devices), or whose plaintext payload meets other pre-defined criteria (e.g. indicating that the message is of a certain type or significance).

Conveniently when a device forwards a message it leaves the payload of the message unchanged. Conveniently when a device forwards a message it leaves the source address of the message unchanged.

The TTL field serves as a message retransmission indicator. As indicated above, the TTL field can be managed in other ways. In general, it is convenient that when a device retransmits a message and/or forwards a message it alters the TTL of the message from that with which the message was received.

It is convenient if, when a device retransmits a message and/or forwards a message it alters the TTL of the message so as to reduce the message's propensity for retransmission. This may, for example be done by decrementing the TTL. There may be a pre-set value of the TTL that indicates that a message is not to be retransmitted. There may be a pre-set threshold and the fact that a message has a TTL beyond (i.e. above or below, by pre-set convention) that threshold may include that that message is not to be retransmitted.

The devices implementing the communication systems described above could form an ad hoc network. The devices could be configured to forward some or all messages they receive. The devices could be configured to forward only messages received from some other devices. That can help to avoid excessive network traffic and/or power consumption. All the devices could be peers in that they have identical roles at a network level in those mesh networks in which they participate. Each mesh network could be a peer-to-peer network.

Each device that actively participates in one of the mesh networks is configured to receive mesh packets and automatically retransmit at least some of those packets using the same transport protocol as that over which they were received. The device thus acts as an automatic relay for mesh packets. The message could be retransmitted using the same data link layer and/or network layer as that over which they were received. Preferably, below the application layer the relayed messages are transmitted using the same set of protocols as those over which they were received.

The devices of the mesh network may use a flood routing mechanism. Using flood routing, which can communicate a transmitted message to many communication devices, involves (i) a means of broadcasting messages to ail devices that are within the communication range of the sending device and (ii) devices that receive a broadcast message to be configured to automatically rebroadcast it so that the rebroadcast message is also received by all devices within the respective communication ranges of the rebroadcasting devices.

The applicant hereby discloses in isolation each individual feature described herein and any combination of two or more such features, to the extent that such features or combinations are capable of being earned out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A communication device configured to communicate according to two communication protocols, comprising:
a processor configured to:
receive a first message according to a first protocol associated with a first network, the first message including a payload,
apply a first network authentication key and a first portion of the first message to an authentication algorithm to produce an authentication output;
determine that the first message is authenticated in response to the authentication output matching a second portion of the first message;
automatically transmit a second message according to the first protocol, the second message comprising an identical payload to the payload of the first message;
generate a third message by modifying the second portion of the first message such that authenticating the third message requires a second network authentication key; and
automatically transmit the third message according to the second protocol associated with the second network, the third message also comprising an identical payload to the payload of the first message.

2. The communication device of claim 1, wherein the processor is configured to transmit the second message only if the first message is authenticated.

3. The communication device of claim 1, wherein the processor is configured to transmit the third message only if the first message is authenticated.

4. The communication device of claim 1, wherein the first and second messages are of identical formats.

5. The communication device of claim 1, wherein the first and third messages each include a retransmission indicator, and the processor is configured to transmit the third message only if the retransmission indicator of the first message indicates that retransmission is permitted.

6. The communication device of claim 1, wherein the first and third messages each include a retransmission indicator, and the processor is configured to:
modify the retransmission indicator of the third message to indicate that fewer retransmissions of the third message are permitted than the number of permitted retransmissions of the first message indicated by the retransmission indicator of the first message.

7. The communication device of claim 1, wherein the first and second messages include a network indicator field that indicates a logical network to which the respective message belongs.

8. The communication device of claim 7, wherein the network indicator field of the second message indicates the same logical network as the network indicator field of the first message.

9. The communication device of claim 7, wherein the network indicator field of the second message indicates a different logical network than the network indicator field of the first message.

10. The communication device as claimed in any of claim 7, wherein the third message includes a network indicator field that indicates the logical network to which the third message belongs.

11. The communication device of claim 10, wherein the network indicator field of the third message indicates the same logical network as the network indicator field of the first message.

12. The communication device of claim 10, wherein the network indicator field of the third message indicates a different logical network than the network indicator field of the first message.

13. A method for relaying communication messages by a communication device, comprising:
receiving a first message by the communication device, wherein the first message is received according to a first protocol associated with a first network and includes a payload;
applying a first network authentication key and a first portion of the first message to an authentication algorithm to produce an authentication output;
determining that the first message is authenticated in response to the authentication output matching a second portion of the first message;
automatically transmitting a second message according to the first protocol, the second message comprising an identical payload to the payload of the first message;
generating a third message by modifying the second portion of the first message such that authenticating the third message requires a second authentication key associated with a second network; and
automatically transmitting a third message according to the second protocol associated with a second network, the third message also comprising an identical payload to the payload of the first message.

14. The communication device of claim 1, wherein the first network is a mesh network and the first protocol is a mesh network protocol.

15. The communication device of claim 1, wherein the processor is further configured with processor executable instructions to perform operations such that the third message is transmitted to a communication device that is not a logical part of either the first network or the second network.

* * * * *